March 14, 1944.  F. DIEFFENBACH  2,343,891
DEVICE FOR ANALYZING SURFACE DEFECTS
Filed Feb. 2, 1942    2 Sheets-Sheet 2
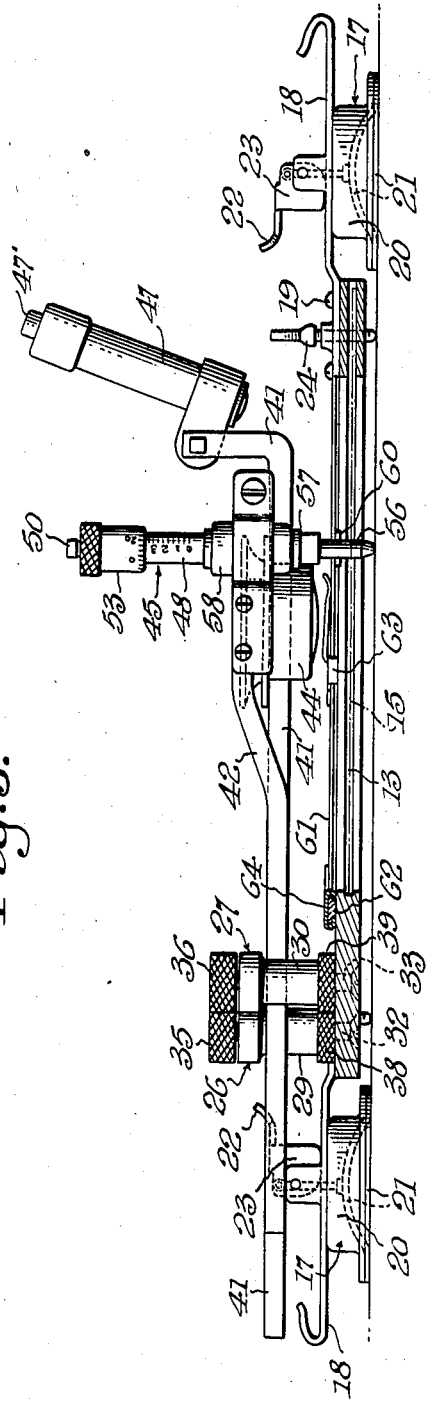
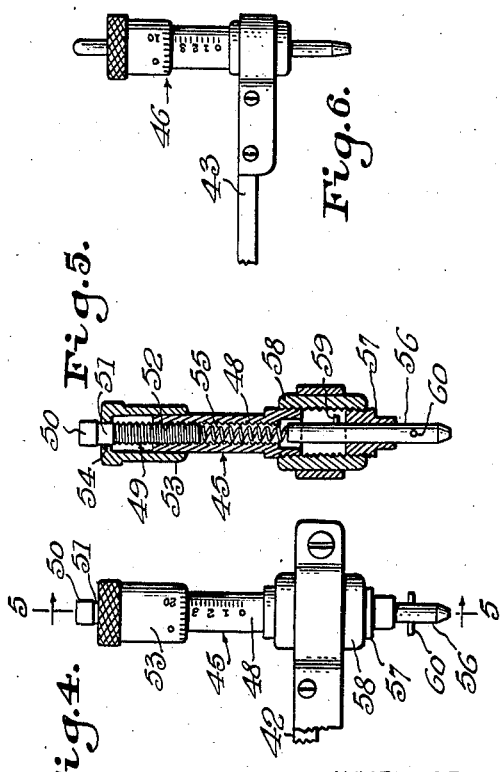
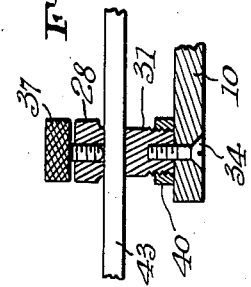
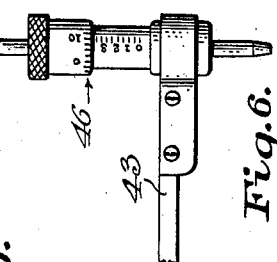
INVENTOR
FERD DIEFFENBACH
BY
ATTORNEYS Patented Mar. 14, 1944

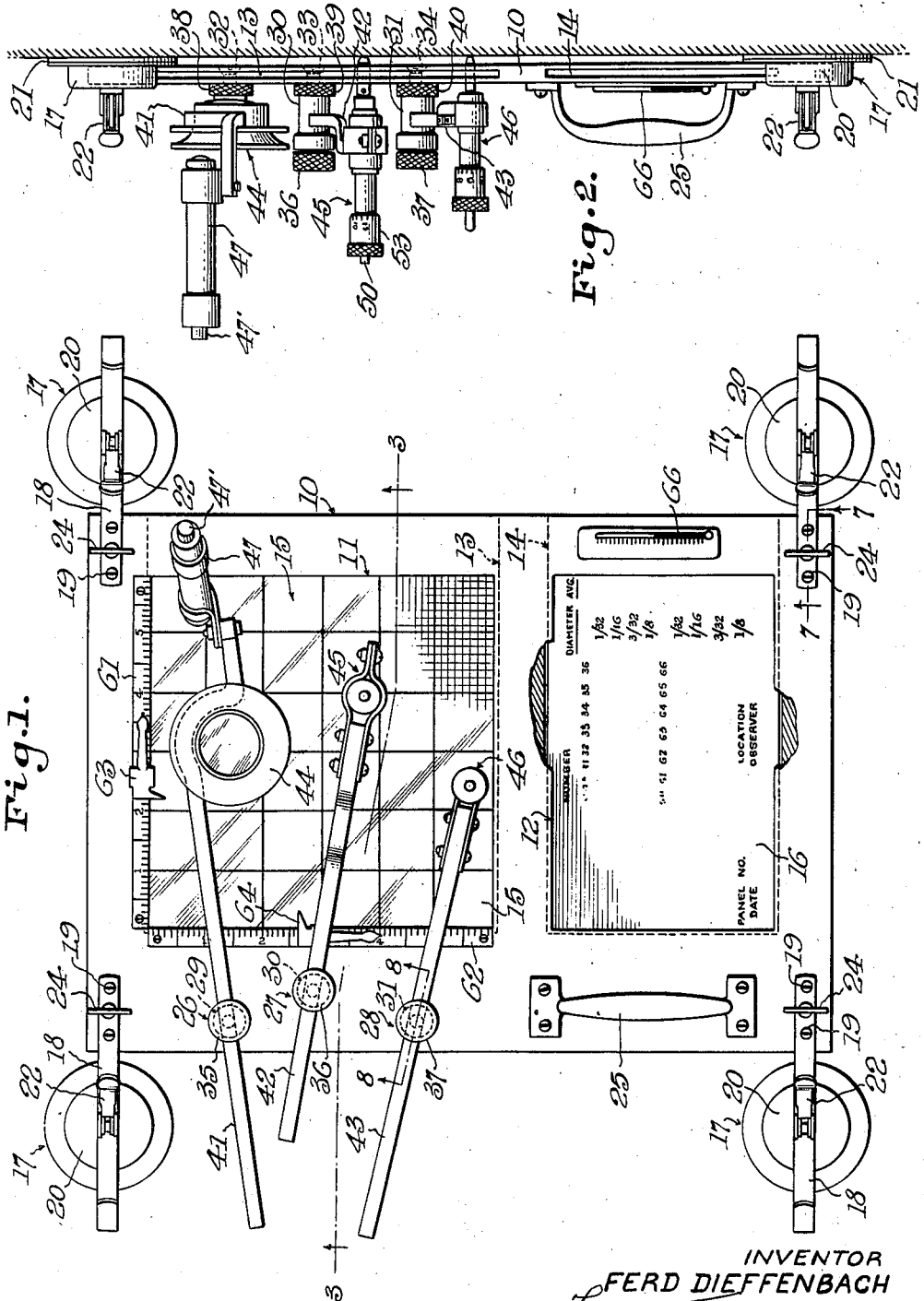

2,343,891

UNITED STATES PATENT OFFICE 2,343,891

DEVICE FOR ANALYZING SURFACE DEFECTS

Ferd Dieffenbach, Pittsburgh, Pa.

Application February 2, 1942, Serial No. 429,149

6 Claims. (Cl. 73—51)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a means for detecting and analyzing defects on coated, corroded, or eroded surfaces.

One object of the invention is to provide a simple and effective device for analyzing and reporting surface defects, particularly on paint systems, corroded or eroded metal surfaces, and other similar surfaces having defects.

Another object of the invention is to provide a device of the class described which is adapted to be detachably connected to the surface to be tested, and by which the exact location of the tested areas may be designated by a coordinate chart and recorded upon a record sheet.

With these and other objects in view this invention consists in certain novel details of construction, combination and arrangement of parts to be more fully hereinafter described and claimed.

Referring to the drawings in which corresponding parts are indicated by similar reference characters:

Fig. 1 is a front elevation showing the chart board with its various indicating and recording devices and suction means for detachably retaining it in operative position;

Fig. 2 is an end elevation of the device as shown in Fig. 1;

Fig. 3 is a section taken on the line 3—3 of Fig. 1;

Fig. 4 is a detail view showing an elevation of the hardness testing device, and means of attachment to its supporting arm;

Fig. 5 is a sectionized view taken on the line 5—5 of Fig. 4;

Fig. 6 is an elevation of the micrometer showing means of attachment to its supporting arm;

Fig. 7 is a sectionized view taken on the line 7—7 of Fig. 1, showing in detail a portion of the leveling device; and Fig. 8 is a sectionized view taken on the line 8—8 of Fig. 1, showing in detail the construction of the supporting members.

Up to the time of the development of the device which forms the subject matter of this invention, there has been no satisfactory means of measuring and reporting surface defects, and two different observers would invariably report different results concerning the same surface. The device described herein is adapted to measure the degree and extent of surface defects and to facilitate the recording of the intensity of defects per unit of area—for example a surface may have average defects amounting to five $\frac{1}{32}$" diameter blisters 0.035" high, per square inch, plus two $\frac{1}{16}$" diameter blisters 0.121" high, per square inch, which description represents a very definite portrayal of the system for comparison. Also the abrasion resistance may be measured in pounds per square inch. The device also permits the observation and recording of the data in difficult position such as on a lock gate or similar position in that the device is complete in one unit including the holder for record cards. These cards may be filed directly as a record of inspection.

The analyzing device comprises a rectangular frame formed with upper and lower rectangular openings 11 and 12. The frame is provided with slots 13 and 14 which extend from a lateral edge inward between the front and rear surfaces of the frame 10. These slots 13 and 14 which are slightly wider than the rectangular openings 11 and 12 are adapted to receive a coordinate sheet 15 and record card 16 which are slidably mounted therein, as shown in Figs. 1, 2 and 3.

The frame 10 is provided with four retaining devices 17 which are connected to the frame by supporting strips 18, the latter being attached thereto by screws 19. These retaining devices 17 which are adapted to hold the frame adjacent to any surface which is to be tested, comprise suction or vacuum cups 20 which are fitted with rubber suction members or discs 21. The suction members 21 are attached at their peripheries to the edge of the cups 20 and centrally they are pivotally attached to elevating members or levers 22 provided with lateral cam members 23, which when moved in contact with the strips 18 extend the central portion of the suction members so as to create a partial vacuum beneath them and thereby effect the retention of the cups to the surface they contact. In order to level the frame with respect to the surface, four thumb screws 24, threaded within the supporting strips 18, located adjacent the corners of the frame, are provided.

At the left margin of the frame 10 is located a handle 25 and three rotatable supporting members 26, 27 and 28. These supporting members comprise posts 29, 30 and 31, which are provided respectively with retaining screws 32, 33 and 34, thumb screws 35, 36 and 37 and knurled adjusting nuts 38, 39 and 40.

The supporting members 26, 27 and 28 are adapted to retain arms 41, 42 and 43, to which are attached respectively a low power microscope 44, a hardness testing device 45 and a micrometer 46, the latter being adapted to measure the heights of elevation or depressions on the surface tested.

The supporting members 26, 27 and 28 may be turned within the frame 10 and locked in any angular position by means of the knurled adjusting nuts 38, 39 and 40, and the arms which support the instruments may be moved longitudinally within the supporting members 26, 27 and 28, and locked in position by the thumb screws 35, 36 and 37. Thus the microscope 44, the hardness testing device 45 and the micrometer 46 may be placed at any position over the surface exposed through the upper rectangular opening 11 in the frame 10 or in the field of the coordinate sheet 15, and retained at these positions by tightening the locking or adjusting nuts 38, 39 and 40, and the thumb screws 35, 36 and 37.

The microscope 44 is provided with a small battery energized lamp 47 controlled by a push button 47' and pivotally connected to the extremity of the arm 41, and functions to illuminate the field of the microscope as well as the surface being examined with the other instruments.

The hardness testing device is of the abrasion type and is shown in detail in Figs. 4 and 5. The instrument consists of an internally threaded tubular member 48 into which is fitted a screw member 49 having a circular head 50 and a square portion 51 intermediate a threaded section 52 and the circular head. To the squared portion 51 of the screw member 49 is attached an adjusting member or drum 53, which is tubular in form and is provided with a head having a square opening 54 which fits the squared portion 51 of the screw member 49. The interior of the tubular portion of the drum 53 surrounds the tubular member 48. Beneath the screw member 49 and within the tubular member 48 is placed a spring 55 which extends to the top of the plunger 56 which is slidably mounted within a bushing member 57. The bushing 57 is mounted within a tubular connecting member 58 which engages threads at the lower extremity of the tubular member 48 and on the bushing 57. The plunger 56 which floats within the bushing 57 is provided with stop pins 59 and 60 which limit the movement of the plunger within the bushing.

The outer surfaces of the drum 53 and the tubular member 48 are provided with graduations so as to show the deflection of the spring and the resulting load applied to the floating plunger or pin 56. The instrument is used by adjusting spring 55 so that when the point of the plunger 56 engages a surface the pin 60 just contacts bushing 57 without force, and with no load on the spring. The instrument is then moved over the surface of the material which is being tested, with increases in load applied by the compression of the spring 55 against the plunger, the amount of load being read directly on the vernier.

Surface irregularities do not interfere with the accuracy of this instrument as with other existing instruments, as the load is kept constant in that the spring deflection is kept constant regardless of surface defects. The surface strength is taken as the pounds per square inch necessary to break or mar the surface. The spring in the instrument may be readily changed to accommodate different materials. The frame 10 is provided with scales 61 and 62 which are equipped with sliding indicators 63 and 64, to mark the particular area of the coordinate system being studied.

The coordinate system as shown in the photographs is made on a transparent plastic sheet with 1-inch major divisions and ⅛" minor divisions. This coordinate system is used to measure the approximate size of surface defects and their intensity. This sheet which is indicated by the numeral 15 slides into the frame and may be removed very readily and also replaced with other coordinate scales.

The instrument is also equipped with a thermometer 66 to record the temperature at which observations are made in that abrasion resistance and paint blister size are functions of temperature.

In the operation of the device the frame 10 is first detachably connected to the surface by means of the vacuum cups 20 so that the rectangular opening 11 outlines an area to be tested.

The transparent coordinate sheet 15 is then slid into place through the slot 13 in the frame so that the instrument or instruments used in the test and which are capable of angular and linear adjustment over the surface outlined by the rectangular opening in the frame, as described above, may be set at various predetermined locations within the test area.

After an instrument is placed at a desired location with respect to the coordinates on the transparency, this location is marked by the sliding indicators, and the transparent coordinate sheet removed.

The instrument is then locked in the position in which it is set and the testing operations begun.

The locations of the sliding indicators and the test data obtained when the test instrument is operated at this location are recorded on the record sheet which is slid into a position adjacent the coordinate transparency through the slot 14 in the frame.

After sufficient data is obtained at one test point, the transparent coordinate sheet is reinserted through the slot 13 and the test instrument placed in another location and the operations as explained above repeated.

The detachable frame provides a means for retaining the test instruments as well as a record sheet for recording test data in proximity to the area tested which adds greatly to the convenience of the operator.

Although in the foregoing description a definite construction is set forth, the device may be readily varied from the assembly shown to suit the particular surface being analyzed, such as the modification of the microscope power, abrasion testing range, coordinate system, etc., and changes in other details without departing from the scope and spirit of the invention.

Having described my invention, what I claim as new and wish to secure by Letters Patent is:

1. A surface testing apparatus comprising a frame provided with a rectangular opening, means in connection with said frame for effecting its detachable connection with the surface under test, a plurality of test instruments carried by said frame and adjustable thereover relative to said opening, a transparency bearing a coordinate system, said transparency being slidably mounted within said frame above the portion of the surface outlined by said rectangular opening and adapted to indicate the location and extent of testing areas outlined by the opening in said frame to be tested by said testing instruments.

2. A surface testing apparatus comprising a frame provided with a rectangular opening, means in connection with said frame for effecting its detachable connection with the surface under test, a plurality of swively mounted and linearly adjustable test instruments carried by said frame and adjustable thereover relative to said opening, a transparency bearing a coordinate system, said transparency being slidably mounted within said frame above the portion of the surface outlined by said rectangular opening and adapted to indicate the location and extent of the areas outlined by the opening in said frame to be tested by said instruments.

3. A surface testing apparatus comprising a frame provided with a rectangular opening, means in connection with said frame for effecting its detachable connection with the surface under test, a plurality of swively mounted and linearly adjustable test instruments carried by said frame and adjustable thereover relative to said opening, means for locking said test instruments in predetermined positions, a transparency bearing a coordinate system, said transparency being slidably mounted within said frame above the portion of the surface outlined by said rectangular opening and adapted to indicate the location and extent of the areas outlined by the opening in said frame to be tested by said instruments.

4. A surface testing apparatus comprising a frame provided with a rectangular opening, longitudinal and vertical scales mounted adjacent the edges of said opening, sliding indicators mounted on said scales, means in connection with said frame for effecting its detachable connection with the surface under test, a plurality of swively mounted and linearly adjustable test instruments carried by said frame and adjustable thereover relative to said opening, means for locking said test instruments in predetermined positions, a transparency bearing a coordinate system, said system being slidably mounted within said frame above the portion of the surface outlined by said rectangular opening and adapted to indicate the location and extent of the areas outlined by said frame to be tested by said testing instruments.

5. A surface testing apparatus comprising a frame provided with a rectangular opening, a handle attached to said frame, means in connection with said frame for effecting its detachable connection with the surface under test, a plurality of angularly and linearly adjustable test instruments carried by said frame and adjustable thereover relative to said opening, a transparent coordinate sheet slidably mounted within said frame above the portion of the surface outlined by said rectangular opening and adapted to indicate the location and extent of the areas outlined by the rectangular opening in said frame to be tested by said testing instruments.

6. A surface testing apparatus comprising a frame provided with a sight opening, means in connection with said frame for effecting its detachable connection with the surface under test, a plurality of test instruments carried by said frame and adjustable thereover relative to said opening, a transparency removably positioned within said frame and adapted to overlie the test surface defined by the sight opening, said transparency being provided with a coordinate system, and means adjacent said opening and coacting with the coordinate system to locate the point of test on said test surface.

FERD DIEFFENBACH.